United States Patent [19]
Ferguson et al.

[11] Patent Number: 5,924,509
[45] Date of Patent: Jul. 20, 1999

[54] TRACTION CONTROL APPARATUS AND METHOD FOR A HYDROSTATICALLY DRIVEN WORK MACHINE

[75] Inventors: Alan L. Ferguson; Conrad G. Grembowicz, both of Peoria, Ill.; Dale M. Olson, Hamel, Minn.

[73] Assignee: Caterpillar Paving Products Inc., Peoria, Ill.

[21] Appl. No.: 08/820,625

[22] Filed: Mar. 19, 1997

[51] Int. Cl.$^6$ .................................................. B60K 28/16
[52] U.S. Cl. ........................... 180/197; 180/20; 180/307
[58] Field of Search ............................. 180/197, 20, 305, 180/306, 307, 308

[56] References Cited

U.S. PATENT DOCUMENTS

| | | | |
|---|---|---|---|
| 4,103,489 | 8/1978 | Fletcher et al. | 60/395 |
| 4,186,816 | 2/1980 | Pfundstein | 180/243 |
| 4,189,920 | 2/1980 | Dezelan | 60/420 |
| 4,197,705 | 4/1980 | Westveer | 60/445 |
| 4,236,595 | 12/1980 | Beck et al. | 180/243 |
| 4,260,280 | 4/1981 | Hirn et al. | 404/122 |
| 4,399,886 | 8/1983 | Pollman | 180/197 |
| 4,402,377 | 9/1983 | Brooks et al | 180/197 |
| 4,518,053 | 5/1985 | Queveau | 180/14.2 |
| 4,530,416 | 7/1985 | Kassai | 180/307 |
| 4,870,601 | 9/1989 | Sandstrom | 364/550 |
| 4,976,332 | 12/1990 | Hein | 180/197 |
| 5,147,010 | 9/1992 | Olson et al. | 180/197 |
| 5,201,570 | 4/1993 | Heren et al. | 303/10 |
| 5,775,453 | 7/1998 | Williams et al. | 180/197 |

FOREIGN PATENT DOCUMENTS

| | | | |
|---|---|---|---|
| 0226844 | 7/1987 | European Pat. Off. | B60K 28/16 |
| 0765773 | 4/1997 | European Pat. Off. | B60K 17/35 |
| 2658259 | 8/1991 | France | F16H 47/04 |
| 3620163 | 12/1987 | Germany | B60K 28/16 |

*Primary Examiner*—Kevin Hurley
*Attorney, Agent, or Firm*—David M. Masterson; Steven G. Kibby

[57] ABSTRACT

A traction control apparatus for a work machine having an engine and a hydrostatic drive system that powers a first and second set of ground engaging traction devices is disclosed. The hydrostatic drive system includes a variable displacement pump being rotatably driven by the engine, and first and second variable displacement motors which receive pressurized fluid from the variable displacement pump, the first motor driving the first set of ground engaging traction devices and the second motor driving the second set of ground engaging traction devices. The control apparatus includes a first speed sensor that produces a first speed signal indictative of the rotational speed of the first set of ground engaging traction devices and a second speed sensor that produces a second speed signal indictative of the rotational speed of the second set of ground engaging traction devices. An electronic controller receives the first and second speed signals, compares the speed signal magnitudes to each other to determine which set of the ground engaging traction devices are slipping, and decreases the displacement of the motor associated with the slipping ground engaging traction device to increase the torque associated with the motor associated with the non-slipping ground engaging traction device.

5 Claims, 3 Drawing Sheets

TRACTION CONTROL APPARATUS AND METHOD FOR A HYDROSTATICALLY DRIVEN WORK MACHINE

TECHNICAL FIELD

This invention relates generally to a traction control apparatus for a hydrostatically driven work machine.

BACKGROUND ART

Many machines, particularly earth working machines, use a hydrostatic drive system to drive the ground engaging traction devices of the machine. Such work machines when used in construction sites and off-road locations generally experience loss of traction. For example, slipping may occur to either the front or rear sets of the ground engaging traction devices on sloped terrain or loose soil.

Typically, the hydrostatic drive system includes an engine that provides rotational motion to a propel pump which produces highly pressurized fluid to first and second variable displacement motors that drive the ground engaging traction devices. When one of the ground engaging traction devices begin to slip, the motor that is associated with the slipping ground engaging traction device receives most of the hydraulic fluid flow from the pump. Consequently, little fluid flow is left for the other motor. Thus, the machine is prevented from moving during a slipping condition. Further, the slipping condition wastes engine horsepower and can damage the motors from over-speeding.

The present invention is directed toward overcoming one or more of the problems as set forth above.

DISCLOSURE OF THE INVENTION

In one aspect of the present invention a traction control apparatus for a work machine having an engine and a hydrostatic drive system that powers a first and second set of ground engaging traction devices is disclosed. The hydrostatic drive system includes a variable displacement pump being rotatably driven by the engine, and first and second variable displacement motors which receive pressurized fluid from the variable displacement pump, the first motor driving the first set of ground engaging traction devices and the second motor driving the second set of ground engaging traction devices. The control apparatus includes a first speed sensor that produces a first speed signal indictative of the rotational speed of the first set of ground engaging traction devices and a second speed sensor that produces a second speed signal indictative of the rotational speed of the second set of ground engaging traction devices. An electronic controller receives the first and second speed signals, compares the speed signal magnitudes to each other to determine which set of the ground engaging traction devices are slipping, and decreases the displacement of the motor associated with the slipping ground engaging traction device to increase the torque associated with the motor associated with the non-slipping ground engaging traction device.

BRIEF DESCRIPTION OF THE DRAWINGS

For a better understanding of the present invention, reference may be made to the accompanying drawings in which.

BEST MODE FOR CARRYING OUT THE INVENTION

Figure 1:
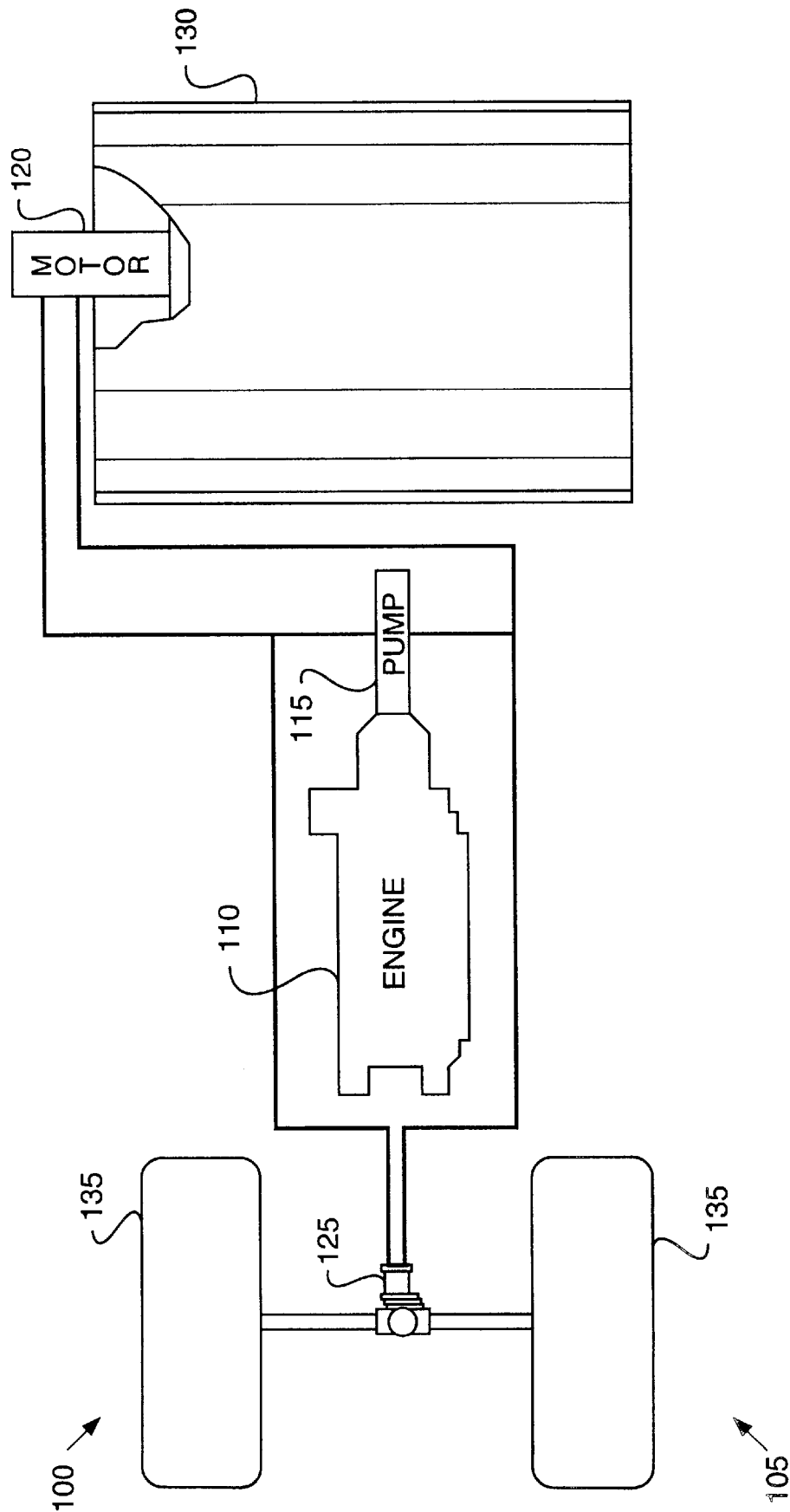
FIG. 1 illustrates a hydrostatic drive system associated with a vibratory soil compactor.

The present invention pertains to a traction control system which is adapted to be utilized for any work machine that uses a hydrostatic drive for propulsion. One example of a work machine that uses a hydrostatic drive is shown in relation to FIG. 1, which illustrates an hydrostatic drive system 100 of a vibratory soil compactor 105. An engine 110 provides rotational motion to a propel pump 115 which delivers pressurized fluid to first and second variable displacement motors 120,125. The first and second motors 120,125 power a first and second set of ground engaging traction devices 130,135. In this example, the first and second set of ground engaging traction devices 130,135 include a vibratory drum and a set of wheels. The first motor 120 is said to be a drum motor which drives the drum 130 and the second motor 125 is said to be a wheel motor that drives the wheel set 135.

Figure 2:
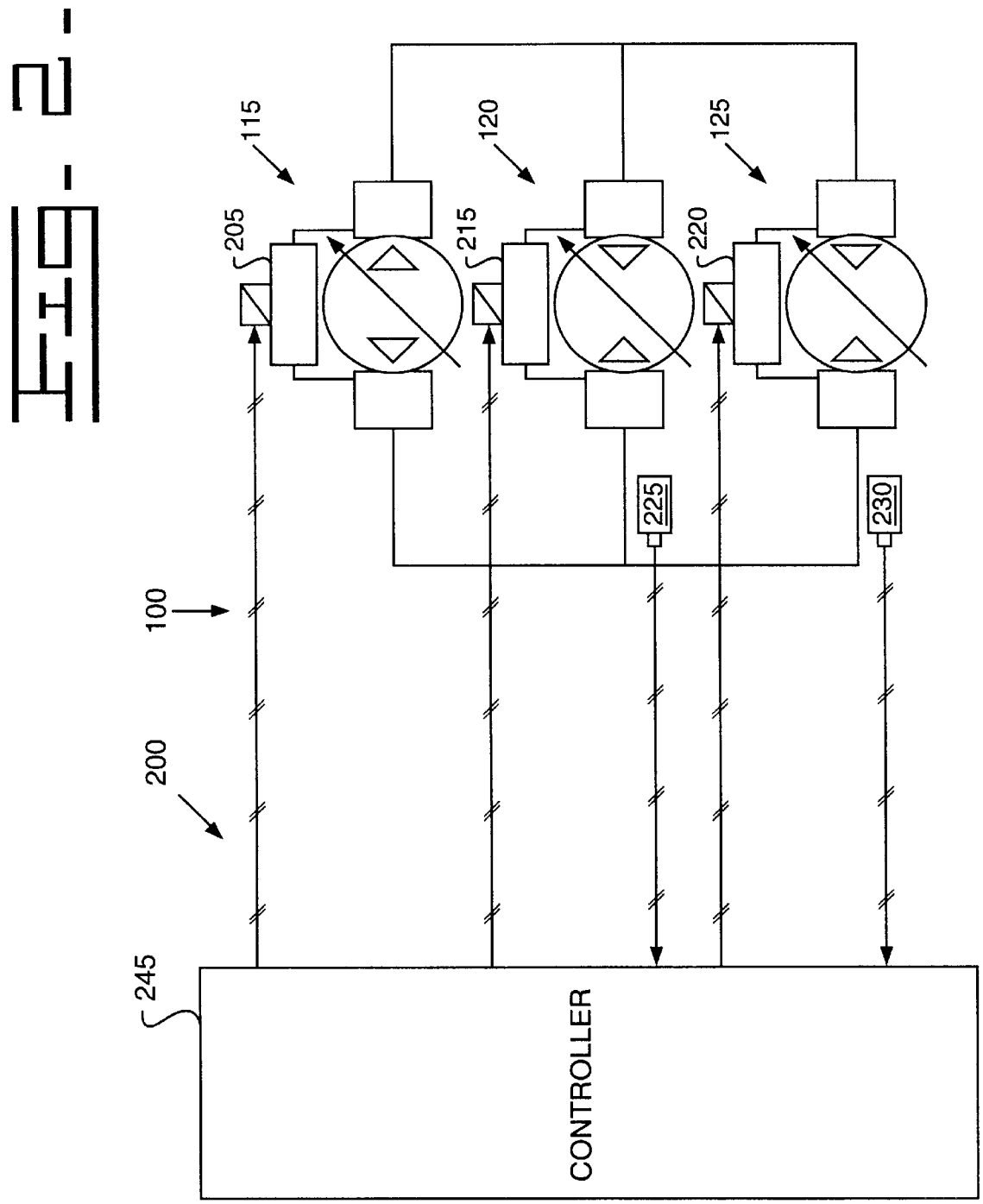
FIG. 2 illustrates a hydrostatic drive system, engine, and hydraulic pump and motor arrangement.

Reference is now made to FIG. 2 which illustrates the traction control system 200 of the present invention. As shown, the hydrostatic drive system 105 includes a prime mover 110, preferably an internal combustion engine, that drives a variable displacement hydraulic pump 115. The swashplate of the pump 115 is actuable by a displacement solenoid 205. The pump 115 provides high pressure fluid to the two parallel connected variable displacement motors, e.g., the drum motor 120 and the wheel motor 125. Each motor includes a displacement solenoid 215,220 that is used to actuate the swashplate of the respective motors 120,125. The motors 120,125 are used to provide the necessary torque in order to propel the machine. Although a single pump is shown, it will be apparent to those skilled in the art that the present invention will equally be applicable to multiple pump and motor arrangements.

The traction control system 200 includes a microprocessor based controller 245 that includes system memory. The controller 245 receives various sensing signals and controls the displacement of the pump 115 and motors 120,125. The sensing signals include signals representing the rotational speed of the wheels 135 and drum 130. For example, a first speed sensor or drum speed sensor 225 produces a first signal or drum speed signal in response to the rotational speed of the drum 130. Similarly, a second speed sensor or wheel speed sensor 230 produces a first or wheel speed signal in response to the rotational speed of the wheel 135. The controller 245 receives the first and second speed signals, compares the speed signal magnitudes to each other to determine which set of the ground engaging traction devices are slipping, and decreases the displacement of the motor associated with the slipping ground engaging traction device to increase the torque associated with the motor associated with the non-slipping ground engaging traction device. The controller 245 utilizes arithmetic units to control various processes according to software programs. Typically, the programs are stored in read-only memory, random-access memory or the like. One such process is a traction control method that is discussed in relation to block diagram discussed below.

Figure 3:
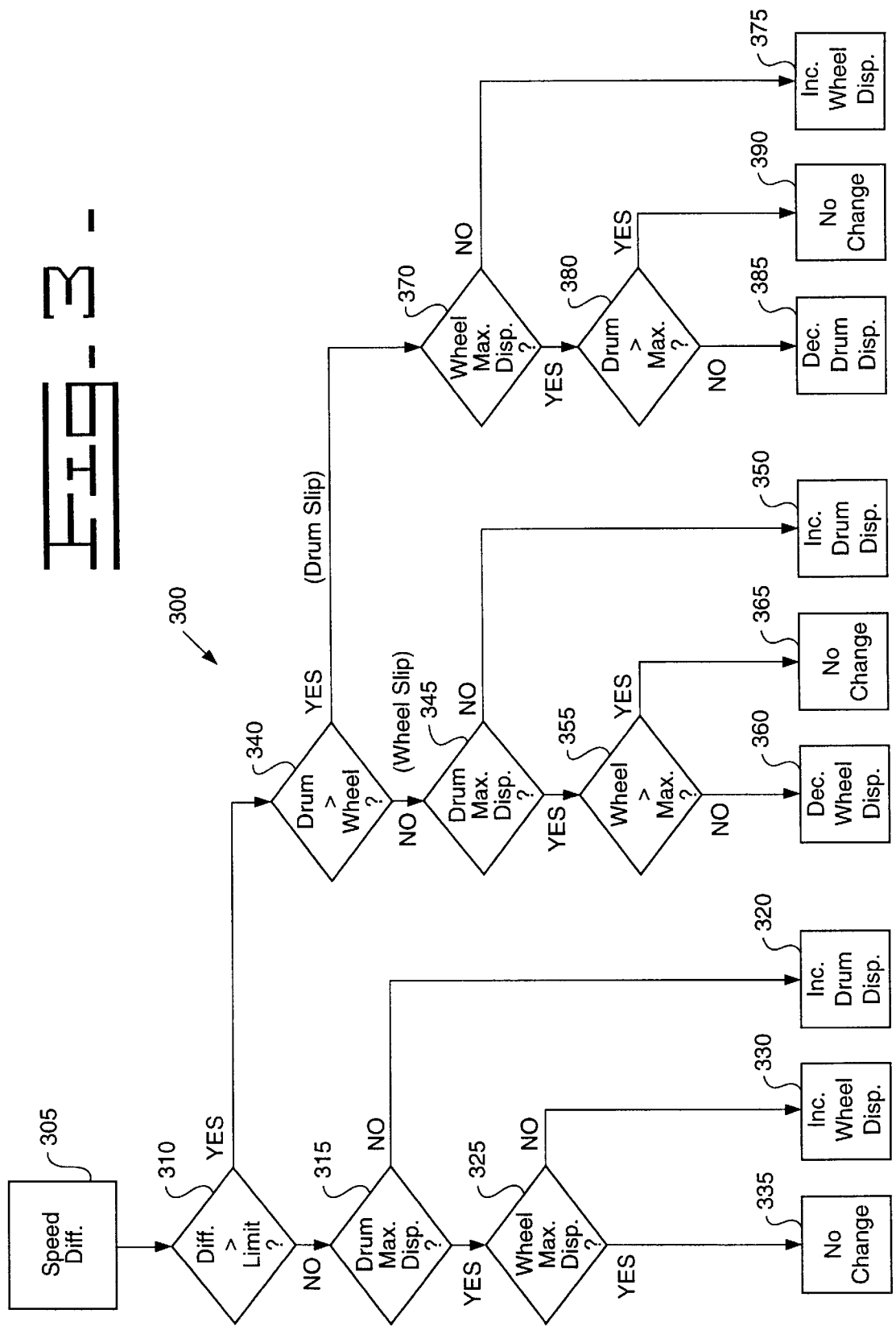
FIG. 3 illustrates a block diagram of a traction control method of the present invention.

Reference is now made to the block diagram shown on FIG. 3, which illustrates the program control of traction control method 300 of the present invention. First, at block 305, the method compares the rotational speeds associated with the wheels 135 and the drum 130 to determine if slipping is occurring. For example, the method determines the absolute value of the difference in magnitude between the wheel speed and the drum speed. The program control then proceeds to block 310 where the method determines whether the speed difference is greater than a predetermined limit value. If the speed difference does not exceed the predetermined limit value, then the method insures that the drum and wheels motors 120,125 are at the maximum displacement. Accordingly, the method at block 315, determines whether the drum motor 120 is at the maximum displacement. If the drum motor 120 is not at the maximum displacement, then the controller 245 increases the drum motor displacement via the displacement solenoid 215, signified by block 320. If the drum motor 120 is at the maximum displacement, then the program control proceeds to block 325 where the method determines whether the wheel motor 125 is at the maximum displacement. If the wheel motor 125 is not at the maximum displacement, then the controller 245 increases the wheel motor displacement via the displacement solenoid 220, signified by block 330. If both the drum and wheel motors 120,125 are at the maximum displacement, then the program control proceeds to block 335 where the respective motor displacements are unchanged.

Reference is now made to block 340, where after the method has determined that slipping is occurring, i.e., the speed difference is greater than the predetermined limit value, the method determines whether the drum speed is greater than the wheel speed to determine which ground engaging traction device is slipping. If the drum speed is less than the wheel speed, then the wheel is slipping and the program control proceeds to block 345 where the control determines whether the drum motor 120 is at the maximum displacement. If the drum motor 120 is not at the maximum displacement, then the program control transfers to block 350 where the controller 245 increases the drum motor displacement to the maximum displacement value. However, if the drum motor 120 is at the maximum displacement, then the program control proceeds to block 355, where the method determines whether the wheel speed is greater than the maximum wheel speed. If the wheel speed is less than the maximum wheel speed, then the controller 245 at block 360, decreases the wheel motor displacement to increase the torque associated with the drum motor 120. By increasing the torque of the drum motor 120, then the drum 130 can better propel the machine since the wheels 135 are slipping. However, if the wheel speed is greater than the maximum wheel speed, then the wheel motor displacement is left unchanged, at block 365, so as to not overspeed the wheel motor.

Referring now to block 370, where after the method has determined that the drum 130 is slipping, i.e., the drum speed is greater than the wheel speed, the method determines whether the wheel motor 125 is at the maximum displacement. If the wheel motor 125 is not at the maximum displacement, then the program control transfers to block 375 where the controller 245 increases the wheel motor displacement to the maximum displacement value. However, if the wheel motor 125 is at the maximum displacement, then the program control proceeds to block 380, where the method determines whether the drum speed is greater than the maximum wheel speed. If the drum speed is less than the maximum drum speed, then the controller 245 at block 385, decreases the drum motor displacement to increase the torque associated with the wheel motor 125. By increasing the torque of the wheel motor 125, then the wheel 135 can better propel the machine since the drum 130 is slipping. However, if the drum speed is greater than the maximum drum speed, then the drum motor displacement is left unchanged, at block 390, so as to not overspeed the drum motor.

Thus, while the present invention has been particularly shown and described with reference to the preferred embodiment above, it will be understood by those skilled in the art that various additional embodiments may be contemplated without departing from the spirit and scope of the present invention.

Industrial Applicability

The present invention is adapted to aid the traction of any work machine that uses a hydrostatic drive for propulsion. One example of a work machine that uses a hydrostatic drive is shown in relation to FIG. 1, which illustrates the hydrostatic drive system 100 of a vibratory soil compactor 105. A traction control system 200 monitors the rotational speeds of the drum 130 and wheels 135 to determine whether the drum 130 or wheels 135 are slipping. In response to detecting the slipping of the drum 130 or wheels 135, the controller 245 reduces the displacement of the motor associated with the slipping device in order to minimize the wasted hydraulic flow to the slipping motor; thereby, increasing the torque on the non-slipping motor.

Other aspects, objects and advantages of the present invention can be obtained from a study of the drawings, the disclosure and the appended claims.

We claim:

1. A traction control apparatus for a work machine having an engine and a hydrostatic drive system that powers a first and second set of ground engaging traction devices, comprising:

a variable displacement pump being rotatably driven by the engine;

first and second variable displacement motors which receive pressurized fluid from the variable displacement pump, the first motor driving the first set of ground engaging traction devices and the second motor driving the second set of ground engaging traction devices;

a first speed sensor that produces a first speed signal indicative of the rotational speed of the first set of ground engaging traction devices;

a second speed sensor that produces a second speed signal indicative of the rotational speed of the second set of ground engaging traction devices; and an electronic controller that receives the first and second speed signals, determines from said speed signals whether one of said first set and said second set of ground engaging traction devices is slipping, increases to a maximum the displacement of the motor associated with a set of ground engaging traction devices not determined to be slipping and thereafter decreases the displacement of the motor associated with a slipping set of ground engaging traction devices.

2. A traction control apparatus, as set forth in claim 1, wherein the first and second set of ground engaging traction devices include a vibratory drum and a wheel set.

3. A traction control apparatus, as set forth in claim 1, wherein said controller compares to a maximum value the speed signals from a set of ground engaging traction devices determined to be slipping and decreases the displacement of the motor associated with the slipping set of ground engaging traction devices only when said rotational speed is less than said maximum value.

4. A traction control method for a work machine having an engine and a hydrostatic drive system that powers a first and second set of ground engaging traction devices, the hydrostatic drive system including a variable displacement pump being rotatably driven by the engine, and first and second variable displacement motors which receive pressurized fluid from the variable displacement pump, the first motor driving the first set of ground engaging traction devices and the second motor driving the second set of ground engaging traction devices, the method including the steps of:

producing a first speed signal indicative of the rotational speed of the first set of ground engaging traction devices;

producing a second speed signal indicative of the rotational speed of the second set of ground engaging traction devices; and receiving the first and second speed signals, determining in response to the difference between the speed signal magnitudes whether a set of the ground engaging traction devices is slipping, comparing to a maximum value the speed signals from a set of ground engaging traction devices determined to be slipping and decreasing the displacement of the motor associated with the slipping set of ground engaging traction devices only when said rotational speed is less than said maximum value.

5. A traction control method, as set forth in claim 4, further comprising the step of increasing to a maximum the displacement of a motor associated with a set of ground engaging traction devices not determined to be slipping.

* * * * *